United States Patent
Yuan

(10) Patent No.: US 9,541,173 B2
(45) Date of Patent: Jan. 10, 2017

(54) BELT DRIVE WITH COMPRESSION SPAN

(71) Applicant: THE GATES CORPORATION, Denver, CO (US)

(72) Inventor: Jing Yuan, Rochester Hills, MI (US)

(73) Assignee: GATES CORPORATION, Denver, CO (US)

(*) Notice: Subject to any disclaimer, the term of this patent is extended or adjusted under 35 U.S.C. 154(b) by 0 days.

(21) Appl. No.: 14/539,850

(22) Filed: Nov. 12, 2014

(65) Prior Publication Data

US 2016/0084358 A1    Mar. 24, 2016

Related U.S. Application Data

(63) Continuation-in-part of application No. 14/490,109, filed on Sep. 18, 2014.

(51) Int. Cl.
| | |
|---|---|
| B62J 13/00 | (2006.01) |
| F16D 1/00 | (2006.01) |
| F16H 57/02 | (2012.01) |
| F16H 7/00 | (2006.01) |
| F16H 7/24 | (2006.01) |
| F16H 7/02 | (2006.01) |
| F16H 7/18 | (2006.01) |
| F16H 9/24 | (2006.01) |
| F16H 7/08 | (2006.01) |

(52) U.S. Cl.
CPC ............... *F16H 7/023* (2013.01); *F16H 7/18* (2013.01); *F16H 9/24* (2013.01); *F16H 2007/0872* (2013.01)

(58) Field of Classification Search
CPC .......... F16G 1/28; F16H 7/023; F16H 55/171; F16H 7/14; B62D 5/0424
USPC ......................................... 474/144, 148, 150
See application file for complete search history.

(56) References Cited

U.S. PATENT DOCUMENTS

| | | | | |
|---|---|---|---|---|
| 2,251,772 | A * | 8/1941 | Zuber ..................... | G03B 21/43 242/356.3 |
| 3,404,576 | A * | 10/1968 | Cicognani ................. | F16G 1/28 474/148 |
| 3,885,471 | A * | 5/1975 | Morine ...................... | F16P 1/02 474/144 |
| 4,037,485 | A * | 7/1977 | Hoback ..................... | F16G 1/28 474/148 |
| 4,041,789 | A * | 8/1977 | Hoback ................. | F16H 55/171 474/148 |
| 4,366,880 | A * | 1/1983 | Miller ...................... | B62J 13/00 180/219 |
| 4,869,708 | A * | 9/1989 | Hoffmann ................. | F01L 1/02 474/140 |

(Continued)

*Primary Examiner* — Henry Liu
(74) *Attorney, Agent, or Firm* — Jeffrey A. Thurnau, Esq.; Paul N. Dunlap, Esq.

(57) ABSTRACT

A toothed belt drive with compression span comprising a first sprocket, a second sprocket, a toothed belt having a toothed belt length and trained between the first sprocket and the second sprocket, a first linear guide member in cooperative relation to and disposed a predetermined distance (B) from the toothed belt, a second linear guide member in cooperative relation to and disposed a predetermined distance (B) from the toothed belt, and the toothed belt length greater than a drive length such that the toothed belt forms a free-standing arcuate span between the first sprocket and the second sprocket on a toothed belt compression span.

15 Claims, 3 Drawing Sheets

(56) References Cited

U.S. PATENT DOCUMENTS

| | | | | |
|---|---|---|---|---|
| 5,134,901 A * | 8/1992 | Grady | B01F 3/04446 | 261/DIG. 26 |
| 5,221,236 A * | 6/1993 | Raymer | B62M 9/16 | 474/109 |
| 5,662,541 A * | 9/1997 | Roovers | F16G 1/28 | 474/149 |
| 6,036,611 A * | 3/2000 | Bigo | B60K 17/36 | 474/146 |
| 6,135,907 A * | 10/2000 | Hong | F16G 1/00 | 474/148 |
| 6,139,455 A * | 10/2000 | Spurling | F16H 7/24 | 474/112 |
| 7,191,866 B2 * | 3/2007 | Sasaki | B62D 5/0424 | 180/443 |
| 7,850,562 B2 * | 12/2010 | DeGroot | B65G 15/26 | 198/411 |
| 8,043,185 B2 | 10/2011 | Nicolai | | |
| 8,308,589 B2 | 11/2012 | Nicolai et al. | | |
| 2001/0031679 A1 * | 10/2001 | Hammerbeck | F16H 19/06 | 474/140 |
| 2002/0042316 A1 * | 4/2002 | Young, Jr. | B62J 13/00 | 474/140 |
| 2003/0083167 A1 * | 5/2003 | Hammerbeck | F16H 9/02 | 474/239 |
| 2004/0005952 A1 * | 1/2004 | Bachmair | F01L 1/02 | 474/111 |
| 2004/0097309 A1 * | 5/2004 | Kirstein | F16H 9/04 | 474/101 |
| 2005/0197224 A1 * | 9/2005 | Sasaki | B62D 5/0424 | 474/116 |
| 2005/0282670 A1 * | 12/2005 | Kim | B62J 13/04 | 474/144 |
| 2007/0129192 A1 * | 6/2007 | Song | B62D 5/0424 | 474/148 |
| 2010/0120565 A1 * | 5/2010 | Kochidomari | B60K 17/08 | 474/144 |
| 2011/0251003 A1 * | 10/2011 | Nishimiya | F16H 7/02 | 474/144 |

* cited by examiner

BELT DRIVE WITH COMPRESSION SPAN

RELATED APPLICATIONS

This application is a CIP of and claims priority from U.S. Ser. No. 14/490,109 filed Sep. 18, 2014.

FIELD OF THE INVENTION

The invention relates to a belt drive with a compression span, and more particularly, to a toothed belt drive having a drive length which is less than a toothed belt length such that the toothed belt forms a free-standing arcuate span between the first sprocket and the second sprocket on a toothed belt compression span.

BACKGROUND OF THE INVENTION

The initial installation tension is the most critical factor to a successful synchronous belt drive. A synchronous belt drive is used to drive machines where a timed or synchronous condition is required. A synchronous belt uses a toothed belt to achieve the desired timing effect.

The conventional synchronous belt drive requires the tension ratio, which is defined as the ratio between the tight side tension and slack side tension, to be about eight (8) for good results. Using a tension ratio of about 8 proves to be a good approach for the constant load drive, for example, the fan drive, conveyer belt drive, and so on.

With high quality synchronous belt development, automotive industries explored the possibility of using synchronous belts to replace the metal chain for the transfer case applications. The traditional transfer case uses a metal chain to split the power from the engine to drive the front wheel and rear wheels. This arrangement requires a chain guide, sealed case, and oil lubrication. The advantage of the belt drive is the complete elimination of the oil, for a so-called dry transfer case.

The challenge of a dry transfer case is the belt initial installation tension. Because the large variation of the torque passing through the transfer case, if a tension ratio of 8 is used the required initial tension is significantly high. The high initial tension results in a poor drive efficiency and belt noise. On the other hand, if the initial tension is too low, the belt may jump a tooth when high torque is encountered.

The concept of using belt backward buckling to achieve the zero tension drive has been explored in the prior art. The idea is to use a belt pitch length longer than the drive length, and let the belt buckle backward on the slack side span. In the prior art device two bearings are placed at the exit and entrance of the slack span and serve as the guide to lead the belt into the desired backward buckling. When the forward torque is applied, the extra belt length is taken up by the backward buckling that forms an arc shape. The belt back bending stiffness is relevant to allowing the belt buckling in the backward direction.

In comparison to a metal chain drive, there is no bending stiffness due to the flexible chain link connections, therefore making it impossible to achieve the backward buckling.

Representative of the art is U.S. Pat. No. 8,308,589 which discloses a belt and chain drive for vehicles or for use in drive technology with an input shaft and an output shaft supported on a frame, the input shaft and the output shaft project out of the frame, with the following features: a) gear transmissions with gear wheels, which are embodied as belt and chain drives, are located between the input shaft and the output shaft, b) all of the gear wheels are constantly in rotation during operation, c) the gear transmissions located between the input shaft and the output shaft are embodied as belt and chain drives with toothed belts as traction mechanisms and with pulleys as gear wheels, d) the traction mechanism are reinforced with aramid, Kevlar, carbon fibers or other fibrous materials, is characterized in that e) the traction mechanism is pressed into a kidney-like shape onto the pulleys by at least one component during no-load rotation, and that under the effect of load this component does not touch the traction mechanism, and f) the kidney-like shape of the traction mechanism during no-load rotation is formed by a convex curvature of the driving side and by a concave curvature of the slack side, and g) the kidney-like shape of the traction mechanisms under load is formed by a straight shape of the driving side and by an intensified concave curvature of the slack side.

What is needed is a toothed belt drive having a drive length which is less than a toothed belt length such that the toothed belt forms a free-standing arcuate span between the first sprocket and the second sprocket on a toothed belt compression span. The present invention meets this need.

SUMMARY OF THE INVENTION

An aspect of the invention is to provide a toothed belt drive having a drive length which is less than a toothed belt length such that the toothed belt forms a free-standing arcuate span between the first sprocket and the second sprocket on a toothed belt compression span.

Other aspects of the invention will be pointed out or made obvious by the following description of the invention and the accompanying drawings.

The invention comprises a toothed belt drive with compression span comprising a first sprocket, a second sprocket, a toothed belt having a toothed belt length and trained between the first sprocket and the second sprocket, a first linear guide member in cooperative relation to and disposed a predetermined distance (B) from the toothed belt, a second linear guide member in cooperative relation to and disposed a predetermined distance (B) from the toothed belt, and the toothed belt length greater than a drive length such that the toothed belt forms a free-standing arcuate span between the first sprocket and the second sprocket on a toothed belt compression span.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
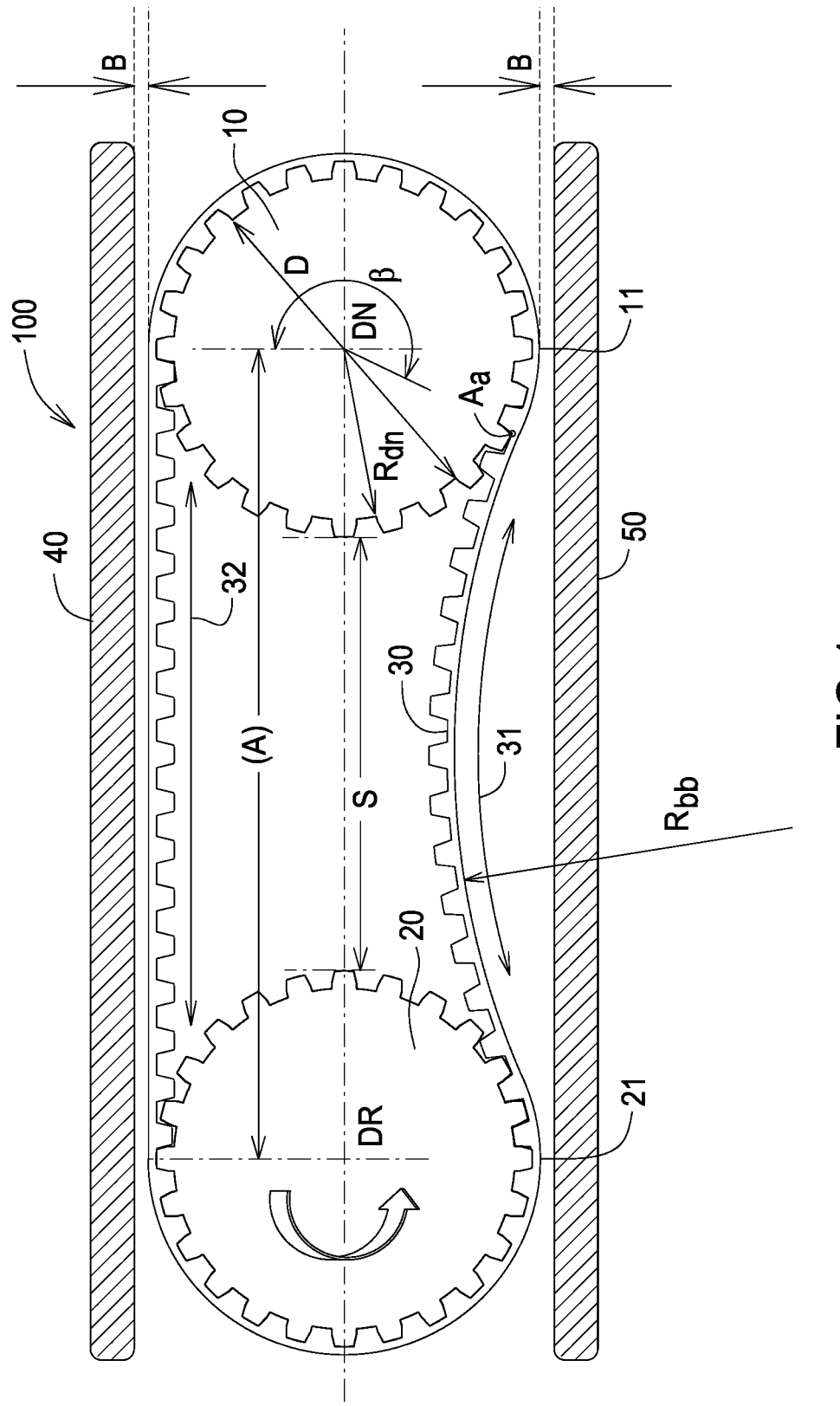
FIG. 1 is a schematic view of a system.

FIG. 1 is a schematic view of a system. The system 100 comprises a first sprocket 10 and a second sprocket 20. Toothed belt 30 is trained between the sprockets. A first linear guide 40 is in cooperative relation to the toothed belt between the first sprocket and the second sprocket. A second linear guide 50 is in cooperative relation to the toothed belt between the first sprocket and the second sprocket.

Arcuate section 31 of belt 30 is formed in the compression span between the first and second sprocket. The concave arcuate span 31 is with reference to linear guide 50 in the Figure. Concave span 31 forms in the described position when sprocket 20 is the driving sprocket. Span 32 will become concave when sprocket 10 is the driving sprocket. The arcuate concave segment 31 is self-supporting, free-standing and only forms on the slack side of the belt. Arcuate section 31 only contacts sprocket 20 and sprocket 10 and is formed without contact by section 31 with any other pulley, tensioner or idler. Section 31 is under an axial compression.

In FIG. 1 span 32 is under tension and span 31 is under compression. Under reverse torque span 32 will become concave and span 31 will then be under tension.

In the illustrated example system variables are:

| | |
|---|---|
| Belt length overall | 784 mm |
| Belt pitch length | 14 mm |
| Sprocket center distance (A) | 219 mm |
| Difference belt length to drive length | 10 mm |
| Initial guide gap clearance (B) | 2 mm |
| Each sprocket | 24 teeth |

The belt length is determined by belt pitch length multiplied by the number of teeth on the belt. For equivalent sprocket diameters, the drive length is two times the sprocket center distance (A), plus the ½ the number of teeth in the first sprocket (10) plus ½ the number of teeth in the second sprocket (20) multiplied by the belt pitch length.

In equation form:

Drive length=2×(A)+(½ number of sprocket 10 teeth)×belt pitch length+(½ number of sprocket 20 teeth)×belt pitch length Using two stationary linear guides of nylon or other suitable low friction material and placing the linear guides parallel to the belt span can achieve the stable belt backward buckling, i.e. the concave arc portion, under both forward and reverse load on the belt slack side.

The gap (B) between the stationary linear guide 40 and 50 and the belt can be adjustable. A suitable gap (B) is between 1 mm and 2 mm. Assuming a 10 mm difference between the belt length and drive length gives a locked center distance (A) of 219 mm. All numeric variable values are examples only and are not intended to limit the invention.

The inventive drive comprises the combination of a tension span on one side and a compression span on the other. The compression side of the system can be modeled as a straight beam subject to an axial compression force. When the load reaches the critical value, i.e. buckling load, the beam, or in this case the belt, will buckle. The buckling shape will depend on the boundary condition, i.e. clamping support and simple hinged support. This is called instability of the beam buckling. Whether the beam will buckle to one side or the other is not predictable, each having a 50/50 chance as the system has two potential solutions. By placing a guide on one side the beam will buckle away from the guide, thereby becoming a single solution system. That is, the guide forms a boundary condition. Once formed the concave span is self-perpetuating, that is, no further mechanical contact with the concave portion of the belt is required by any other apparatus such as the linear guide in order for the concave span to maintain its concave shape during operation.

A prior art drive, i.e. chain or belt, uses an idler or tensioner to push the span into the concave arc. In the prior art system the idler or slack side span is also under some tension. A chain drive cannot operate under compression because the chain will collapse due to the non-rigid link connections.

In the inventive system the proper difference between the belt length and the drive length must be selected to assure a stable concave arcuate portion is formed. The greater the difference between the belt length and the drive length, the more pronounced the concave form of the concave arcuate portion. If the belt is too long, the concave arcuate portion becomes too steep and belt life is compromised due to the sharp bending of the belt cord as it passes through the concave arc. If the belt length is too short, the concave arcuate portion is very shallow and un-stable and can buckle forward putting it in contact with the linear guide. This in turn can generate noise as the belt slaps against the guide due to engine torsional vibrations.

Drive length divided by the belt pitch length determines the number of teeth in the belt. The expression $N_f$ can be used where "N" is an integer and "f" is a fractional value. If f=0, or the belt length matches the drive length an "N+1" belt length is selected, that is, the belt length is one belt pitch (belt tooth) longer than the drive length. If $0<f<½$, the "N+1" tooth belt length is selected. If $f>½$, an "N+2" tooth belt length is selected, that is, the belt length is greater than one and half pitch of the drive length and thereby two teeth or twice the belt pitch length. Using the strategy outlined above, the difference between belt length and drive length is between of the belt pitch length and one and half of the belt pitch length. For example, for a 14 mm pitch belt the range would be (0.5)×14 mm=7 mm up to (1.5)×14 mm=21 mm.

The difference in the overall length of the belt compared to the drive length can also be described as follows. Under a tensile load the belt span length between tangent point 11 and tangent point 21 is equal to the center distance (A). Formation of a stable concave portion requires the length of this belt segment 31 between tangent point 11 and 21 to be greater than the center distance (A). The additional belt length required is in the range of times the belt pitch length to 1.5 times the belt pitch length. In this example the belt pitch length is 14 mm and so the range of extra belt length in excess of the drive length is approximately 7 mm to 21 mm.

Referring again to FIG. 1, for a short center distance drive, if S<D the arcuate belt segment 31 has a smaller radius ($R_{bb}$) than the radius ($R_{dn}$) of the driven sprocket 10. "S" is the distance separating the driver sprocket 20 and the driven sprocket 10 measured from the outer perimeter of each sprocket. "D" is the diameter of the driven sprocket 10.

Due to its curvature, arcuate belt segment 31 engages driven sprocket 10 at tangent point "Aa". At tangent point "Aa" the radially inward centripetal force on the arcuate belt segment 31 exceeds the radially outward centrifugal force caused by rotation of the driven sprocket. So long as this condition continues to exist the belt will engage the driven sprocket at point Aa of the driven sprocket. The belt will not contact linear guide 50 and so a small gap "B" spaced from linear guide 50 will persist. In this condition belt segment 31 is concave with respect to guide 50. For S<D, the minimum belt bending radius is approximately S/2. For S<D, the maximum belt bending radius is approximately D/2. Hence, the toothed belt comprises an arcuate belt segment when entrained between the driver sprocket and driven sprocket. Arcuate belt segment 31 describes a belt bending radius ($R_{bb}$) in the range of $S/2 \leq R_{bb} \leq D/2$.

For a large center distance drive, namely S>D, the arc on the arcuate belt segment 31 has a larger radius $R_{bb}$ than the radius of the driven sprocket 10. At tangent point "Aa" the radially inward centripetal force on the arcuate belt segment 31 is less than the radially outward centrifugal force caused by rotation of the driven sprocket 10. In this condition the arcuate belt segment will tend to disengage from sprocket 10 at tangent point "Aa" and will contact guide 50, hence, roller bearings are needed to prevent overheating of the belt at the guide.

Tangent point "Aa" is disposed on sprocket 10 in a position such that belt 21 is in contact with sprocket 10 through an arc β which is greater than 180°. The range of the contact arc β of belt 21 with sprocket 10 is from approximately 190° to approximately 250°.

The inventive drive is advantageous for use in lock center drives. In a lock center drive no provision is made to change the center distance (A) of the sprockets because each sprocket mounting position is fixed. As described, the belt length is slightly longer than the sprocket center distance (A) which would otherwise cause both belt spans 31, 32 to be linear and not buckled or arcuate. The extra belt length is taken by the slack side concave arc portion, 31.

The inventive drive also has a significant impact on the cost of a system. The need of the fraction pitch to match the drive length in a typical system is completely eliminated due to the longer belt length and the ability to take up the extra length by the slack side concave arc.

In operation, the guide 40 or 50 does not contact the belt. The guide only provides a boundary condition to assure the concave portion forms in the proper direction, that is, between the sprockets. Otherwise, the guide does not continually contact the belt once the concave portion is formed. Nor does the guide contact the belt in order to maintain the concave shape. The concave portion is free-standing and requires no mechanical intervention to maintain the arcuate form. The guides 40, 50 momentarily guide the belt when the drive switches the torque, or driver becomes the driven, and driven becomes the driver. The concave span becomes the straight span under the torque reversal, but the belt still does not continually contact the guide due to the gap (B).

Figure 2:
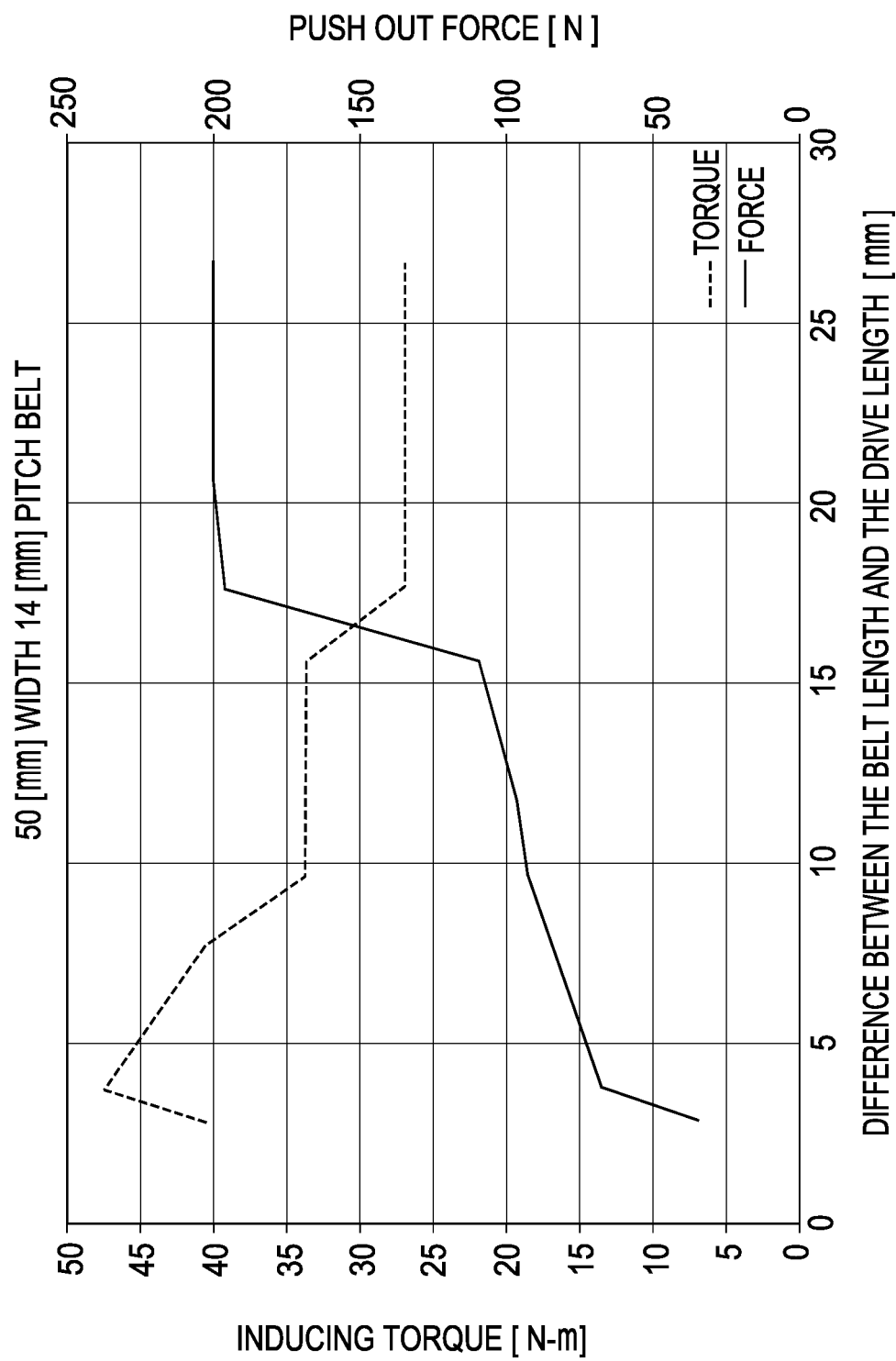
FIG. 2 is a chart of the inducing torque versus push out force.

FIG. 2 is a chart of the inducing torque versus push out force. The belt in this example is 50 mm in width and has a 14 mm pitch. The push out force is the force required to push the concave portion away from the driving sprocket. The push out force increases as the difference between the belt length and drive length increases.

The inducing torque is the torque required to induce the slack side span into the concave arcuate segment 31. At start up, a concave arc portion can exist but the belt will contact a guide 40 or 50 at the sprocket tangent point due to the bulging effect. When the inducing torque is applied, the bulging portion straightens and the gap (B) develops between the guide and the belt. The lower the inducing torque the more easily the belt forms the concave arc portion.

The inducing torque decreases as the difference between the belt length and the drive length increases. The difference between the belt length and the drive length determines the "depth" of the concave or buckled portion of the belt.

Figure 3:
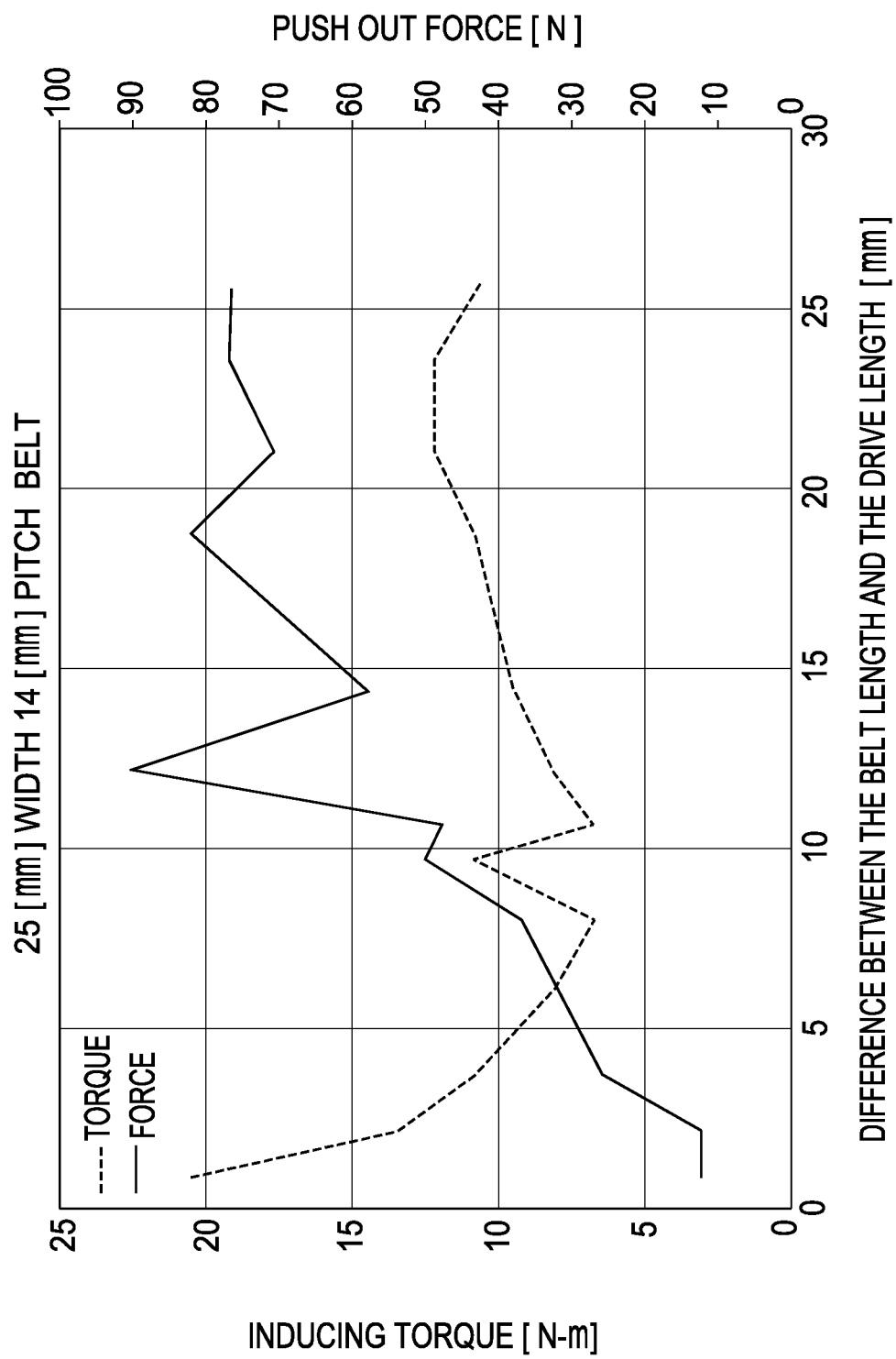
FIG. 3 is a chart of the inducing torque versus push out force.

FIG. 3 is a chart of the inducing torque versus push out force. The belt in this example is half the width of the belt in FIG. 2, that is, 25 mm in width.

Although a form of the invention has been described herein, it will be obvious to those skilled in the art that variations may be made in the construction and relation of parts without departing from the spirit and scope of the invention described herein.

I claim:

1. A toothed belt drive with a compression span comprising:
   a first sprocket;
   a second sprocket;
   a toothed belt having a toothed belt length and trained between the first sprocket and the second sprocket;
   a first linear guide member in cooperative relation to and disposed at the predetermined distance (B) from the toothed belt;
   a second linear guide member in cooperative relation to and disposed a predetermined distance (B) from the toothed belt; and
   the toothed belt length greater than a drive length such that the toothed belt forms a free-standing arcuate span between the first sprocket and the second sprocket on a toothed belt compression span.

2. The belt drive as in claim 1 wherein the difference between the drive length and the toothed belt length is at least ½ times a toothed belt pitch length.

3. The belt drive as in claim 1 wherein the arcuate span is concave with respect to the first linear guide member.

4. The belt drive as in claim 1 wherein the arcuate span is concave with respect to the second linear guide member.

5. A toothed belt drive having a compression span comprising:
   a first sprocket;
   a second sprocket;
   a toothed belt having a toothed belt length, the toothed belt trained between the first sprocket and the second sprocket;
   a first linear guide member in cooperative relation to a toothed belt first span;
   a second linear guide member in cooperative relation to a toothed belt second span; and
   the toothed belt first span having an arcuate concave form when in compression.

6. A toothed belt drive having a compression span comprising:
   a first sprocket;
   a second sprocket;
   a toothed belt having a toothed belt length and trained between the first sprocket and the second sprocket;
   a first linear guide member in cooperative relation to the toothed belt and having a predetermined clearance distance (B) from the toothed belt;
   a second linear guide member in cooperative relation to the toothed belt and having a predetermined clearance distance (B) from the toothed belt; and
   the toothed belt length greater than a drive length by at least one belt pitch length such that the toothed belt forms a compression arcuate span between the first sprocket and the second sprocket.

7. A toothed belt drive comprising:
   a driver sprocket;
   a driven sprocket having a diameter (D) and separated from the driver sprocket by a distance (S);
   a toothed belt trained between the driver sprocket and the driven sprocket;
   a first guide member in cooperative relation to the toothed belt;
   a second guide member in cooperative relation to the toothed belt; and
   the toothed belt comprising a free-standing arcuate belt segment disposed between the driver sprocket and driven sprocket, wherein the arcuate belt segment describes a belt bending radius ($R_{bb}$) in the range of $S/2 \leq R_{bb} \leq D/2$.

8. The belt drive as in claim 7, wherein the arcuate belt segment is under axial compression and a second portion of the toothed belt between the driver sprocket and the driven sprocket is under tension.

9. The belt drive as in claim 7, wherein the toothed belt is in contact with the driven sprocket through an, arc β greater than 180°.

10. The belt drive as in claim 9, wherein the arc β is in the range of approximately 190° to 250°.

11. A toothed belt drive comprising:
a driver sprocket;
a driven sprocket;
a toothed belt trained between the driver sprocket and the driven sprocket;
the toothed belt comprising a free-standing arcuate belt segment disposed between the driver sprocket and driven sprocket;
a first guide member in cooperative relation to the arcuate belt segment;
the arcuate belt segment is subject to axial compression and a second portion of the toothed belt between the driver sprocket and the driven sprocket is in tension; and
the toothed belt is in contact with the driven sprocket through an arc β greater than 180°.

12. The belt drive as in claim 11, wherein the arc β is in the range of approximately 190° to 250°.

13. The belt drive as in claim 11, wherein the first guide member is in spaced relation to the arcuate belt segment.

14. The belt drive as in claim 11 further comprising a second guide member in cooperative spaced relation to the second portion of the toothed belt.

15. The belt drive as in claim 11, wherein the arcuate belt segment only contacts the driver sprocket and the driven sprocket.

* * * * *